(12) United States Patent
Van Der Auwera et al.

(10) Patent No.: US 10,839,480 B2
(45) Date of Patent: Nov. 17, 2020

(54) SPHERE EQUATOR PROJECTION FOR EFFICIENT COMPRESSION OF 360-DEGREE VIDEO

(71) Applicant: QUALCOMM Incorporated, San Diego, CA (US)

(72) Inventors: Geert Van Der Auwera, Del Mar, CA (US); Muhammed Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/926,732

(22) Filed: Mar. 20, 2018

(65) Prior Publication Data

US 2018/0276789 A1 Sep. 27, 2018

Related U.S. Application Data

(60) Provisional application No. 62/475,103, filed on Mar. 22, 2017.

(51) Int. Cl.
| | |
|---|---|
| *G06T 3/00* | (2006.01) |
| *H04N 19/172* | (2014.01) |
| *G06T 7/11* | (2017.01) |
| *H04N 19/182* | (2014.01) |
| *G06T 3/40* | (2006.01) |
| *H04N 19/597* | (2014.01) |
| *H04N 19/88* | (2014.01) |

(52) U.S. Cl.
CPC .......... *G06T 3/0062* (2013.01); *G06T 3/4038* (2013.01); *G06T 7/11* (2017.01); *H04N 19/172* (2014.11); *H04N 19/182* (2014.11); *H04N 19/597* (2014.11); *H04N 19/88* (2014.11); *G06T 2207/10016* (2013.01)

(58) Field of Classification Search
CPC ....... G06T 3/0062; G06T 3/4038; G06T 7/11; G06T 2207/10016; H04N 19/172; H04N 19/182; H04N 19/597; H04N 19/88
See application file for complete search history.

(56) References Cited

U.S. PATENT DOCUMENTS

| | | | | |
|---|---|---|---|---|
| 6,331,869 | B1 * | 12/2001 | Furlan .................. | H04N 5/2259 348/36 |
| 6,466,254 | B1 * | 10/2002 | Furlan .................. | H04N 5/2259 348/36 |
| 9,723,206 | B1 * | 8/2017 | Aloumanis ........ | H04N 5/23238 |

(Continued)

OTHER PUBLICATIONS

International Search Report and Written Opinion—PCT/US2018/023601—ISA/EPO—dated Jun. 25, 2018.

(Continued)

*Primary Examiner* — Sean T Motsinger
(74) *Attorney, Agent, or Firm* — Campbell C. Chiang; Polsinelli LLP

(57) ABSTRACT

Provided are systems and methods for processing 360-degree video data. In various implementations, a spherical representation of a 360-degree video frame can be segmented into a top region, a bottom region, and a middle region. Using a cylindrical equal area projection, such as the Lambert cylindrical equal area projection, the middle region can be mapped into one or more rectangular areas of an output video frame.

22 Claims, 12 Drawing Sheets

(56) References Cited

U.S. PATENT DOCUMENTS

| | | | | |
|---|---|---|---|---|
| 2009/0041379 | A1* | 2/2009 | Shih | G06K 9/32 |
| | | | | 382/276 |
| 2010/0208032 | A1* | 8/2010 | Kweon | G03B 37/00 |
| | | | | 348/36 |
| 2016/0005229 | A1* | 1/2016 | Lee | G06F 3/0488 |
| | | | | 345/419 |
| 2017/0302714 | A1* | 10/2017 | Ramsay | G06F 3/0482 |
| 2018/0007387 | A1* | 1/2018 | Izumi | G06T 9/00 |
| 2018/0007389 | A1* | 1/2018 | Izumi | H04N 21/2343 |
| 2018/0054613 | A1* | 2/2018 | Lin | H04N 19/597 |
| 2018/0192074 | A1* | 7/2018 | Shih | H04N 19/105 |
| 2018/0199042 | A1* | 7/2018 | Wang | H04N 21/44008 |
| 2018/0205934 | A1* | 7/2018 | Abbas | H04N 19/40 |
| 2018/0253820 | A1* | 9/2018 | Knott | G06T 3/0062 |
| 2018/0253879 | A1* | 9/2018 | Li | G06T 3/0062 |
| 2018/0268517 | A1* | 9/2018 | Coban | H04N 19/597 |
| 2018/0276788 | A1* | 9/2018 | Lee | G06T 3/0062 |
| 2018/0276789 | A1* | 9/2018 | Van Der Auwera | |
| | | | | G06T 3/0062 |
| 2018/0276826 | A1* | 9/2018 | Van Der Auwera | |
| | | | | H04N 19/117 |
| 2019/0026934 | A1* | 1/2019 | Shih | G06T 15/005 |
| 2019/0108611 | A1* | 4/2019 | Izumi | G06T 3/00 |
| 2019/0141311 | A1* | 5/2019 | Lee | H04N 19/816 |
| 2019/0174116 | A1* | 6/2019 | Oh | H04N 19/597 |
| 2019/0244326 | A1* | 8/2019 | Shimizu | G06T 3/0062 |
| 2019/0253732 | A1* | 8/2019 | Hendry | H04N 19/597 |
| 2019/0253733 | A1* | 8/2019 | Hendry | H04N 19/70 |
| 2019/0268599 | A1* | 8/2019 | Hannuksela | H04N 19/107 |
| 2019/0335203 | A1* | 10/2019 | Li | H04N 19/593 |
| 2019/0349627 | A1* | 11/2019 | Di | H04N 21/4516 |

OTHER PUBLICATIONS

Lee Y-H., et al., "AHG8: EAP-Based Segmented Sphere Projection with Padding", 6. JVET Meeting; Mar. 31 2017-Apr. 7, 2017; Hobart; (The Joint Video Exploration Team of ISO/IEC JTC1/SC29/WG11 and ITU-T SG.16); URL: http://phenix.int-evry.fr/jvet/, No. JVET-F0052, Mar. 24, 2017 (Mar. 24, 2017), pp. 1-9, XP030150712.

Lin H-C., et al., "AHG8: Compact Cube Layout with Tile Partition", 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0104, Oct. 6, 2016 (Oct. 6, 2016), pp. 1-6, XP030150347.

Van Der Auwera G., et al., "AHG8: ECP with Padding for 360-Degree Video", 7. JVET Meeting; Jul. 13, 2017-Jul. 21, 2017; Torino; (The Joint Video Exploration Team of ISO/IEC JTC1/SC29;WG11 and ITU-T SG.16); URL: http://phenix.int-evry.fr/jvet/, No. JVET-G0074-v2, Jul. 15, 2017 (Jul. 15, 2017), pp. 1-14, XP030150866, the whole document.

Van Der Auwera G., et al., "AHG8: Equatorial Cylindrical Projection for 360-Degree Video", 6th JVET Meeting; Mar. 31, 2017-Apr. 7, 2017; Hobart; (The Joint Video Exploration Team of ISO/IEC JTC1/SC29/WG11 and ITU-T SG.16); URL: http://phenix.int.evry.fr/jvet/ No. JVET-F0026-v2, Apr. 1, 2017, XP030150677, 6 pages.

Ye Y., et al., "Algorithm Descriptions of Projection Format Conversion and Video Quality Metrics in 360Lib", 5th JVET Meeting; Jan. 12, 2017-Jan. 20, 2017; Geneva; (The Joint Video Exploration Team of ISO/IEC JTC1/SC29/WG11 and ITU-T SG.16); URL: http://phenix.int-evry.fr/jvet/,, No. JVET-E1003, Feb. 11, 2017, XP030150650, 22 pages.

Ye Y., et al., "Algorithm Descriptions of Projection Format Conversion and Video Quality Metrics in 360Lib Version 4", 7th JVET Meeting; Jul. 13, 2017-Jul. 21, 2017; Torino; (The Joint Video Exploration Team of ISO/IEC JTC1/SC29/WG11 and ITU-T SG.16); URL: http://phenix.int-evry.fr/jvet/,, No. JVET-G1003, Aug. 17, 2017, XP030150982, pp. 1-40.

Zhang C., et al., "AHG8: Segmented Sphere Projection for 360-degree Video," JVET-E0025, Jan. 12-20, 2017, Joint Video Exploration Team (JVET) of ITU-T SG 16 WP 3 and ISO/IEC JTC1/SC29/WG11, Dec. 30, 2016, XP030150486, 5 Pages.

* cited by examiner

700

Obtaining 360-degree video data including a plurality of video frames, each video frame of the plurality of video frames including a spherical representation of video data for the video frame
702

↓

Segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region
704

↓

Mapping, using a cylindrical equal area projection, the middle region to one or more areas of an output video frame
706

```
┌─────────────────────────────────────────────┐
│ Obtaining 360-degree video data including a │
│ plurality of video frames, each video frame │
│ from the plurality of video frames          │
│ including a two-dimensional representation  │
│ of video data for the video frame           │
│                   802                        │
└─────────────────────────────────────────────┘
                      ↓
┌─────────────────────────────────────────────┐
│ Identifying one or more rectangular areas   │
│ of a video frame from the plurality of      │
│ video frames                                 │
│                   804                        │
└─────────────────────────────────────────────┘
                      ↓
┌─────────────────────────────────────────────┐
│ Mapping, using a cylindrical equal area      │
│ projection, the one or more rectangular     │
│ areas rectangular area into a middle region │
│ of a spherical representation of the video  │
│ data, the spherical representation including│
│ a top region and a bottom region, wherein   │
│ the middle region is located between the    │
│ top region and the bottom region            │
│                   806                        │
└─────────────────────────────────────────────┘
```

FIG. 8

SPHERE EQUATOR PROJECTION FOR EFFICIENT COMPRESSION OF 360-DEGREE VIDEO

CROSS-REFERENCES TO RELATED APPLICATIONS

This application claims the benefit of and priority to U.S. Provisional Application No. 62/475,103, filed on Mar. 22, 2017, which is hereby incorporated by reference herein, in their entireties.

BACKGROUND

Virtual reality (VR) describes a three-dimensional, computer-generated environment that can be interacted within a seemingly real or physical way. Generally, a user experiencing a virtual reality environment can turn left or right, look up or down, and/or move forwards and backwards, thus changing her point of view of the virtual environment. The 360-degree video presented to the user can change accordingly, so that the user's experience is as seamless as in the real world. Virtual reality video can be captured and rendered at very high quality, potentially providing a truly immersive virtual reality experience.

To provide a seamless 360-degree view, the video captured by a 360-degree video capture system typically undergoes image stitching. Image stitching in the case of 360-degree video generation involves combining or merging video frames from adjacent cameras in the area where the video frames overlap or would otherwise connect. The result would be an approximately spherical frame. Similar to a Mercator projection, however, the merged data is typically represented in a planar fashion. For example, the pixels in a merged video frame may be mapped onto the planes of a cube shape, or some other three-dimensional, planar shape (e.g., a pyramid, an octahedron, a decahedron, etc.). Video capture and video display devices generally operate on a raster principle—meaning that a video frame is treated as a grid of pixels—thus square or rectangular planes are typically used to represent a spherical environment.

360-degree video can be encoded for storage and/or transmission. Video coding standards include International Telecommunication Union (ITU) ITU-T H.261, International Standards Organization/International Electronics Commission (ISO/IEC) Motion Picture group (MPEG) MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions and ITU-T H.265 (also known as ISO/IEC MPEG-4 HEVC) with its extensions.

BRIEF SUMMARY

In various implementations, techniques and systems are described for processing 360-degree video data to obtain better coding efficiency. These techniques and systems can include using a segmented sphere projection to divide a spherical representation of a 360-degree video frame into a north pole or top region, a south pole or bottom region, and a equatorial or middle region. The regions can then be mapped to a two-dimensional, rectangular format that can be easier for coding devices to manipulate. In generating this mapping, a cylindrical equal area projection can be used to map the equatorial region into the two-dimensional format. Cylindrical equal area formats modify the aspect ratio of the equatorial region in order to preserve the area. Preserving the area can result in less distortion that would be detrimental to achieving better coding efficiency.

According to at least one example, a method for encoding video data is provided. In various implementations, the method includes obtaining 360-degree video data including a plurality of video frames, each video frame of the plurality of video frames including a spherical representation of video data for the video frame. The method further includes segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The method further includes mapping, using a cylindrical equal area projection, the middle region to one or more rectangular areas of an output video frame.

In another example, an apparatus is provided that includes a memory configured to store 360-degree video data and a processor. The 360-degree video data can include a plurality of video frames, each video frame of the plurality of video frames including a spherical representation of video data for the video frame The processor is configured to and can segment a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The processor is configured to and can map, using a cylindrical equal area projection, the middle region to one or more rectangular areas of an output video frame.

In another example, a non-transitory computer-readable medium is provided having stored thereon instructions that, when executed by one or more processors, cause the one or more processors to perform operations including obtaining 360-degree video data including a plurality of video frames, each video frame of the plurality of video frames including a spherical representation of video data for the video frame. The instructions can further cause the one or more processors to perform operations including segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The instructions can further cause the one or more processors to perform operations including mapping, using a cylindrical equal area projection, the middle region to one or more rectangular areas of an output video frame.

In another example, an apparatus is provided that includes means for obtaining 360-degree video data including a plurality of video frames, each video frame of the plurality of video frames including a spherical representation of video data for the video frame. The apparatus further comprises means for segmenting a video frame from the plurality video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region. The apparatus further comprises means for mapping the middle region to one or more rectangular areas of an output video frame. The apparatus further comprises means for means for mapping, using a cylindrical equal area projection, the middle region to one or more rectangular areas of an output video frame.

In some aspects, the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude. In some aspects, the middle region includes two-thirds of the area of the spherical representation.

In some aspects, mapping the middle region includes selecting a pixel location in the output video frame, and determining a point on the spherical representation corresponding to the pixel location, wherein the point on the spherical representation is determined using a mapping for converting a two-dimensional rectangle to a three-dimensional sphere. These aspects further include sampling a pixel at the point on the spherical representation, and assigning the sampled pixel to the pixel location.

In some aspects, the middle region includes a left view, a front view, and a right view, wherein the left view is placed in the output video frame adjacent to the front view, and wherein the right view is placed adjacent to front view.

In some aspects, the middle region includes a back view, wherein the bottom region is placed in the output video frame adjacent to the back view, and wherein the top region is placed adjacent to the back view.

In some aspects, the methods, computer-readable medium, and apparatus described above can further include mapping the top region into the output video frame and mapping the bottom region into the output video frame In some aspects, the output video frame has a three-by-two aspect ratio.

According to at least one example, a method for encoding video data is provided. In various implementations, the method includes obtaining 360-degree video data including a plurality of video frames, each video frame from the plurality of video frames including a two-dimensional representation of video data for the video frame. The method further includes identifying one or more rectangular areas of a video frame from the plurality of video frames. The method further includes mapping, using a cylindrical equal area projection, the one or more rectangular areas into a middle region of a spherical representation of the video data, the spherical representation further including a top region and a bottom region, wherein the middle region is located between the top region and the bottom region.

In another example, an apparatus is provided that includes a memory configured to store 360-degree video data and a processor. The 360-degree video data can include a plurality of video frames, each video frame from the plurality of video frames including a two-dimensional representation of video data for the video frame The processor is configured to and can identify one or more rectangular areas of a video frame from the plurality of video frames. The processor is configured to and can map, using a cylindrical equal area projection, the one or more rectangular areas into a middle region of a spherical representation of the video data, the spherical representation further including a top region and a bottom region, wherein the middle region is located between the top region and the bottom region.

In another example, a non-transitory computer-readable medium is provided having stored thereon instructions that, when executed by one or more processors, cause the one or more processors to perform operations including obtaining 360-degree video data including a plurality of video frames, each video frame from the plurality of video frames including a two-dimensional representation of video data for the video frame. The instructions can further cause the one or more processors to perform operations including identifying one or more rectangular areas of a video frame from the plurality of video frames. The instructions can further cause the one or more processors to perform operations including mapping, using a cylindrical equal area projection, the one or more rectangular areas into a middle region of a spherical representation of the video data, the spherical representation further including a top region and a bottom region, wherein the middle region is located between the top region and the bottom region.

In another example, an apparatus is provided that includes means for obtaining 360-degree video data including a plurality of video frames, each video frame from the plurality of video frames including a two-dimensional representation of video data for the video frame. The apparatus further comprises means for identifying one or more rectangular areas of a video frame from the plurality of video frames. The apparatus further comprises means for mapping, using a cylindrical equal area projection, the one or more rectangular areas into a middle region of a spherical representation of the video data, the spherical representation further including a top region and a bottom region, wherein the middle region is located between the top region and the bottom region.

In some aspects, the top region includes a surface of the spherical representation above a first latitude of the spherical representation, wherein the bottom region includes a surface of the spherical representation below a second latitude of the spherical representation, wherein the first latitude and the second latitude are equidistant from an equator of the spherical representation. In some aspects, the one or more rectangular areas include two-thirds an area of the video frame.

In some aspects, mapping the one or more rectangular areas includes selecting a point on spherical representation, and determining a pixel location in the video frame that corresponds to the point, wherein the pixel location is determined using a mapping for converting a three-dimensional sphere to two-dimensional rectangle. These aspects further include sampling a pixel from the pixel location, and assigning the sampled pixel to the point.

In some aspects, the one or more additional rectangular areas include a left view, a front view and a right view, wherein the left view is located adjacent to the front view, and wherein the right view is adjacent to the front view.

In some aspects, the one or more additional rectangular areas include a back view, wherein the first rectangular area is adjacent to the back view, and wherein the second rectangular area is adjacent to the back view.

In some aspects, the methods, computer-readable medium, and apparatus discussed above further include mapping a first rectangular area of the video frame into the top region and mapping a second rectangular area of the video frame into the bottom region.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 is a flowchart illustrating an example of a process for processing video data according to the techniques discussed herein.

FIG. 8 is a flowchart illustrating an example of a process for processing video data according to the techniques discussed herein.

DETAILED DESCRIPTION

Figure 1A:
FIG. 1A illustrates a video frame that includes an equirectangular projection of a 360-degree video frame.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides examples only, and is not intended to limit the scope, applicability, or configuration of the disclosure. Rather, the ensuing description of various examples will provide those skilled in the art with an enabling description for implementing any of the examples. It should be understood that various changes may be made in the function and arrangement of elements without departing from the spirit and scope of the invention as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, various examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Virtual reality (VR) describes a three-dimensional, computer-generated environment that can be interacted with in a seemingly real or physical way. In some cases, a user experiencing a virtual reality environment uses electronic equipment, such as a head-mounted display (HMD) and optionally also other articles that can be worn, such as gloves fitted with sensors, to interact with the virtual environment. As the user moves in the real world, images rendered in the virtual environment also change, giving the user the perception that the user is moving within the virtual environment. In some cases, the virtual environment includes sound that correlates with the movements of the user, giving the user the impression that the sounds originate from a particular direction or source. Virtual reality video can be captured and rendered at very high quality, potentially providing a truly immersive virtual reality experience. Virtual reality applications include gaming, training, education, sports video, and online shopping, among others.

360-degree video is video captured for display in a virtual reality environment. For example, a frame of 360-degree video can include a full 360 degrees visible from a given point, such that the frame includes pixels for all or part of a sphere centered on the point. 360-degree video data can also be referred to as spherical video, because 360-degree video captures a view in all directions, such that each 360-degree video frame can be visualized as a sphere of captured pixels. A frame of 360-degree video can be computer-generated, and can be used to present fictional environments. In some applications, video from the real world can be used in the presentation of a virtual reality environment. In these applications, a user can experience another location in the same way that the user can experience a present location. For example, a user can experience a walking tour of Berlin while using a 360-degree video system that is situated in San Francisco.

A 360-degree video system can include a video capture device and a video display device, and possibly also other intermediate devices such as servers, data storage, and data transmission equipment. A video capture device may include a camera set, that is, a set of multiple cameras, each oriented in a different direction and capturing a different view. In various applications, two to six cameras can be used to capture a full 360-degree view centered on the camera set's location. Some video capture devices may use fewer cameras, such as for example video capture devices that capture primarily side-to-side views. A video includes frames, where a frame is an electronically coded still image of a scene. Cameras capture a certain number of frames per second, which is referred to as the camera's frame rate.

In some cases, to provide a seamless 360-degree view, the video captured by each of the cameras in the camera set undergoes image stitching. Image stitching in the case of 360-degree video generation involves combining or merging video frames from adjacent cameras in the area where the video frames overlap or would otherwise connect. The result is an approximately spherical frame of video data. To integrate with existing video systems, the spherical frame of video data can be mapped to a planar format. For mapping techniques such as those used to generate Mercator projections can be used to produce an equirectangular format. As another example, the pixels in a merged video frame may be mapped onto the planes of a cube shape, or some other three-dimensional, planar shape (e.g., a pyramid, an octahedron, a decahedron, etc.). Video capture and video display devices operate on a raster principle—meaning that a video frame is treated as a grid of pixels—thus square or rectangular planes are typically used to represent a spherical environment.

360-degree video frames, mapped to a planar representation, can be encoded and/or compressed for storage and/or transmission. Encoding and/or compression can be accomplished using a video codec (e.g., a codec that is compliant with the High Efficiency Video Coding (HEVC) standard, which is also known as H.265, or a codec that is compliant with the Advanced Video Coding standard, which is also known as H.264, or another suitable coding standard), which results in a encoded and/or compressed video bitstream or group of bitstreams. Encoding of video data using a video codec is described in further detail below.

In some implementations, the encoded video bitstream(s) can be stored and/or encapsulated in a media format or file format. The stored bitstream(s) can be transmitted, for example, over a network, to a receiver device that can decode and render the video for display. Such a receiver device may be referred to herein as a video display device. For example, a 360-degree video system can generate encapsulated files from the encoded video data (e.g., using an International Standards Organization (ISO) base media file format and/or derived file formats). For instance, the video codec can encode the video data and an encapsulation engine can generate the media files by encapsulating the video data in one or more ISO format media files. Alternatively or additionally, the stored bitstream(s) can be provided directly from a storage medium to a receiver device.

A receiver device can also implement a codec to decode and/or decompress an encoded video bitstream. In cases in which the encoded video bitstream(s) are stored and/or encapsulated in a media format or file format, the receiver device can support the media or file format that was used to pack the video bitstream into a file (or files), and can extract the video (and possibly also audio) data to generate the encoded video data. For example, the receiver device can parse the media files with the encapsulated video data to generate the encoded video data, and the codec in the receiver device can decode the encoded video data.

The receiver device can then send the decoded video signal to a rendering device (e.g., a video display device, player device, or other suitable rendering device). Rendering devices include, for example, head-mounted displays, virtual reality televisions, and other 180 or 360-degree display devices. Generally, a head-mounted display is able to track the movement of a wearer's head and/or the movement of a wearer's eyes. The head-mounted display can use the tracking information to render the part of a 360-degree video that corresponds to the direction in which the wearer is looking, so that the wearer experiences the virtual environment in the same way that she would experience the real world. A rendering device may render a video at the same frame rate at which the video was captured, or at a different frame rate.

Projections and mappings are used to represent three-dimensional (3-D) surfaces on two-dimensional (2-D) maps. For example, in 360-degree video applications, projections and mappings can be used to map a 360-degree video frame, which captures pixels in all directions from the camera and can thus be visualized as a sphere, onto a two-dimensional video frame. Examples of two-dimensional projections include an equirectangular (ERP) projection and a cube map (CMP) projection, among others. FIG. 1A illustrates a video frame 110 that includes an equirectangular projection of a 360-degree video frame. An equirectangular projection maps points on a sphere to a two-dimensional map by linearly mapping the latitude and longitude of the points on the sphere to (x, y) coordinates in the video frame 110. The equirectangular projection is able to include all pixels from the 360-degree video frame into the two-dimensional video frame 110, thus transitions from one area of the video frame 110 to another are seamless. Seamless transitions mean that an equirectangular video frame may encode efficiently, in terms of the size of the encoded video frame. This is because operations such as motion estimation and motion compensation produce better results when motion between video frames appears continuous.

Figure 1B:
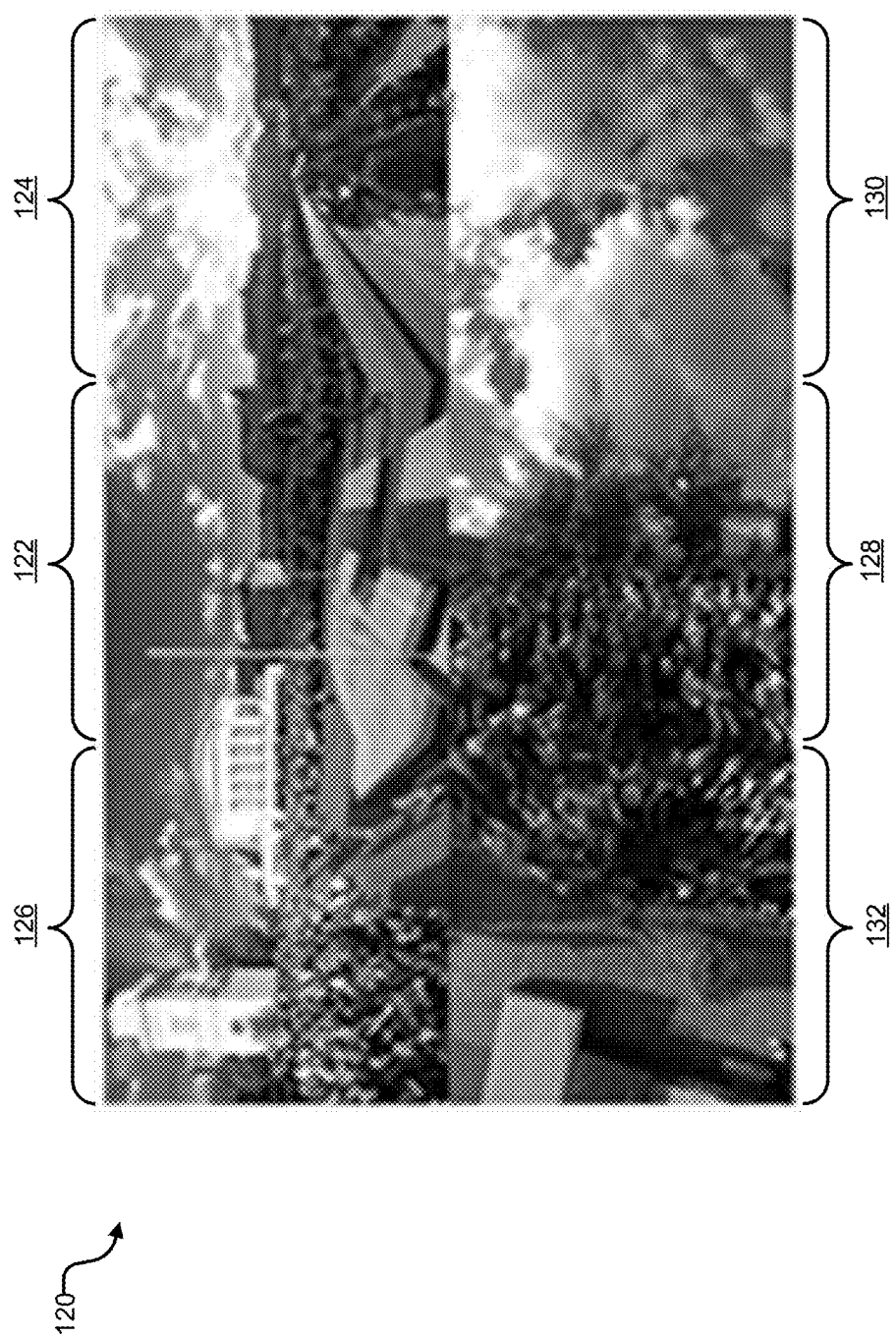
FIG. 1B illustrates a video frame that includes a cube map projection of a 360-degree video frame.

FIG. 1B illustrates a video frame 120 that includes a cube map projection of a 360-degree video frame. The cube map projection projects points on the surface of a sphere to points on planes that are tangent to the sphere surface. That is, the pixels are fitted onto the six faces of a cube, where the height, width, and length of the cube can be such that the cube fits within the sphere. The example of FIG. 1B is a 3×2 arrangement; that is, three cube faces across and two cube faces high. The 3×2 arrangement results in an aspect ratio which can encode efficiently. For example, less data per line of pixels needs to be stored than if an arrangement such as 1×2 is used.

In the example video frame 120 of FIG. 1B, a cube face that can be considered a forward front face 122 is placed in the middle of the upper half of the video frame 120. The cube faces to the right and left of the front face (e.g., a right face 124 and a left face 126) are placed on the right and left sides, respectively, of the upper half of the video frame 120. The cube face that can be considered the back face 128 is rotated −90 degrees and placed in the center of the lower half of the video frame 120. The cube face that can be considered the upward or top face 130 is placed to the right of the back face 128, and is also rotated so that the edge of the top face 130 matches the edge of the back face 128. The cube face that can be considered the down or bottom face 132 is placed to the left of the back face 128, rotated to match the edge of the back face 128.

In the example of FIG. 1B, the pixels included in the front face 122 were selected as the view to be placed directly in front of the viewer. In other examples, a different part of the video data can be selected to be the front view. Additionally, the arrangement of the cube faces illustrates in the example video frame 120 of FIG. 1B is one example arrangement. Other arrangements are also possible.

A cube map projection can be more compact than an equirectangular projection, due to some compressing of pixel data occurring at the edges of the cube faces. The cube map also produces less distortion of the image, which can improve coding efficiency.

Figure 2A:
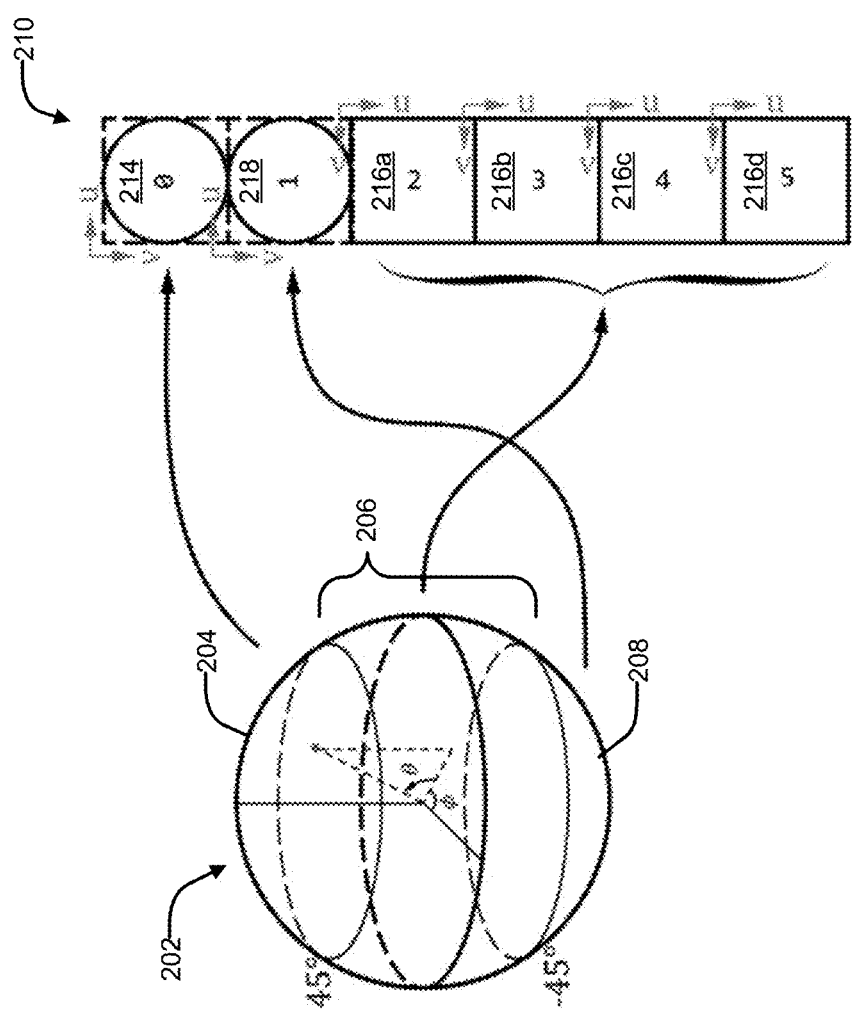
FIG. 2A is a diagram that illustrate the segmented sphere projection of the surface of a sphere to a vertical mapping.

Another projection is one referred to as the segmented sphere projection (SSP). The segmented sphere projection is described in Y. Ye, E. Alshina, and J. Boyce, "Algorithm descriptions of projection format conversion and video quality metrics in 360Lib", JVET-E1003, January 2017 (hereinafter "JVET-E1003"), which is hereby incorporated by reference, in its entirety and for all purposes. FIG. 2A illustrates the segmented sphere projection of the surface of a sphere 202 to an example vertical two-dimensional mapping 210 generated according to the segmented sphere projection. The segmented sphere projection divides the sphere into three segments: a north pole region 204, a south pole region 208, and an equatorial region 206. The north pole and south pole regions are also referred to herein as sphere poles or sphere pole segments. In the illustrated example, the three segments are divided at a latitude of 45 degrees north and 45 degrees south (e.g., as measures from the center of the sphere 202). In other examples, the three segments can be divided at a different degree of latitude.

In the example two-dimensional mapping 210 illustrated in FIG. 2A, the area covered by the north pole region 204 is mapped to a first circular region, which will be referred to as a top view 214. Similarly, the area covered by the south pole region 208 is mapped to a second circular region, which will be referred to as a bottom view 218. In this example, the bottom view 218 is placed in the mapping 210 next to, and below the top view 214. The top view 214 and the bottom view 21 are also labeled Face 0 and Face 1, respectively. The equatorial region 206 is divided into four equal segments, and each segment is mapped to a square area, which are placed in the mapping 210 one below the other, below the bottom view 218. For purposes of this example, the square areas for the equatorial region 206, from top to bottom, will be referred to as the left view 216a, the front view 216b, the right view 216c, and the back view 216d or Face 2, Face 3, Face 4, and Face 5, respectively. The numerical labels for the left view 216a, front view 216b, right view 216c, and back view 216d have been rotated −90 degrees, to illustrate the orientation of pixels place in these view; in this example, four all four view north is oriented to the right and south to the left. In other examples, the left, right, front, and back views can be arranged in different orders and with different north-south orientations than what is illustrated here. In other examples, the areas into which the equatorial region 206 is mapped may not be square. For example, when an angle other than 45 degrees is used to delineate the polar regions, rectangular areas that are not square may better fit the pixel data, and may result in less distortion than if, in this example, the data were mapped to square areas.

In a video application, pixels from each of the north pole region 204 and the south pole region 208 can be mapped to the circular regions of the top view 214 and the bottom view 218, respectively, using an angular projection commonly known as a fisheye projection. In this example, the diameter of the circular regions in each of the top view 214 and the bottom view 218 is the same as the edge of each of the equatorial regions, due to each view covering 90 degrees of latitude. Each of the left view 216a, front view 216b, right view 216c, and back view 216d can be generated using the projection used to generated the equirectangular projection, which can result in relatively smooth transitions between these views.

Figure 2B:
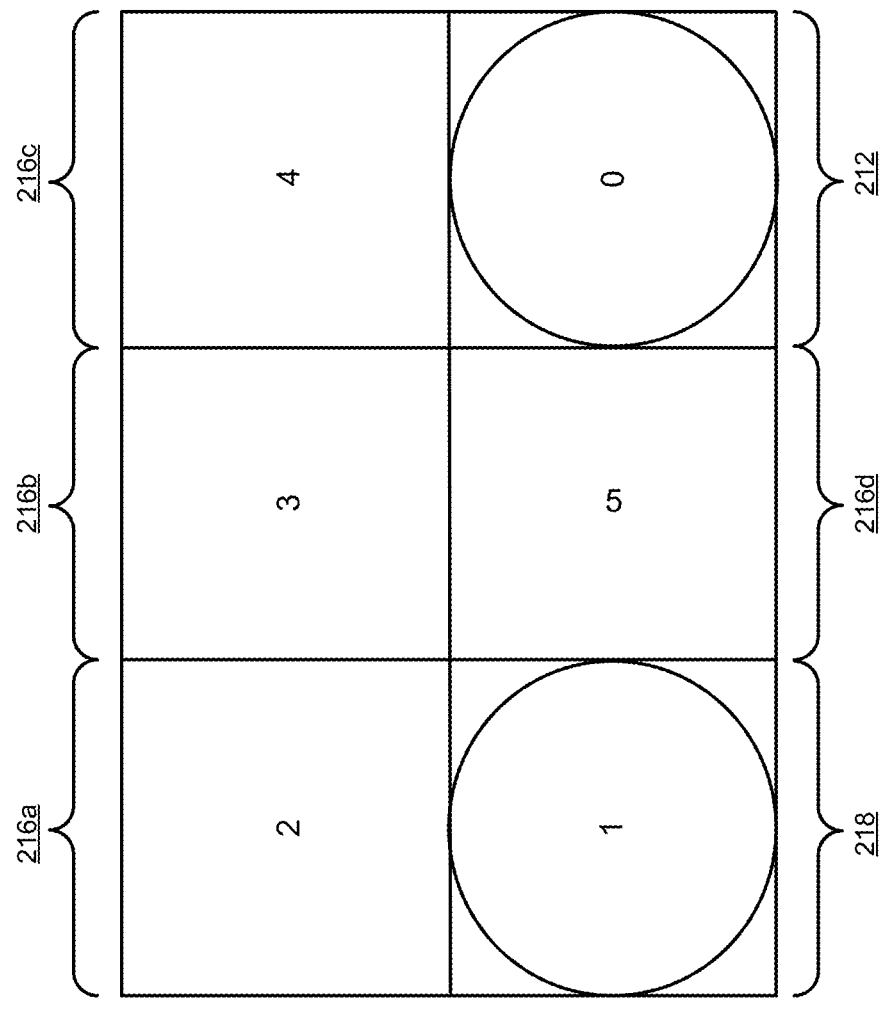
FIG. 2B is a diagram illustrating an alternate mapping for the faces or views that can be generated using the segmented sphere mapping.

FIG. 2B is a diagram illustrating an alternate mapping 220 for the faces or views that can be generated using the segmented sphere mapping. In the example of FIG. 2B, the views are arranged in a 3×2 shape, that is, three faces across and two faces high. In this mapping 220, the front view 216b is placed in the middle of the top half of the mapping 220. The left view 216a and the right view 216c are place to the left and right, respectively, of the front view 216b. The back view 216d is rotated −90 degrees and placed in the middle of the lower half of the mapping 220. Top view 212 is also rotated such that left edge of the top view is aligned with the right edge of the back view 216d, and placed to the right of the back view 216d. The bottom view 218 is also rotated, so that the right edge of the bottom view 218 aligns with the left edge of the back view 216d, and is placed to the left of the back view 216d. In this example, "aligns" means that at least a few pixels from each view that would be adjacent in the original sphere 202 are adjacent in the mapping 220. In this example, the corner areas of the top view 212 and the bottom view 218 that are outside of the fisheye projection are filled with a grey color. In other examples, these corner areas can be filled with another color.

Various techniques can be used to map the equatorial region of the segmented sphere mapping to one or more regions of a two-dimensional video frame. For example, an equirectangular projection can be used, or a cube map projection. These projections can cause a undesirable amount of distortion in the video frame. For example, an equirectangular projection stretches the polar regions across the width of the projection, as well as compressing these areas. As another example, the cube map projection can result in non-linear transitions between the cube faces, such that a boundary between the cube faces is visible.

These and other distortions, besides resulting in visible defects when a video frame is rendered, can reduce coding efficiency. For example, some video compression algorithms search for continuous motion between video frames and/or blocks in a video frame that are visually similar to other blocks in the same video frame or another video frame. Distortion in a video frame can result in what should be continuous motion appearing discontinuous. Additionally or alternatively, blocks that were similar in the original 360-degree video may be distorted in such a way that the pixels in the blocks are no longer similar. These and other issues can reduce the ability of the video compression algorithms to efficiently encode a two-dimensional video frame, resulting in a larger compressed bitstream.

In various implementations, provided are systems and methods for processing 360-degree video data, using a segmented sphere projection, that avoids the problems discussed above. In various implementations, the segmented sphere projection can be used to map a 360-degree video frame to a two-dimensional, rectangular format, which can be easier for video transmitters and receivers to handle. In generating this mapping, a cylindrical equal-area projection can be used to map the equatorial region of the segmented sphere projection to a two-dimensional representation. Cylindrical equal-area projections can result in less distortion in a video frame. Reducing distortion can increase coding efficiency over projections that produce video frames with more distortion. Increased coding efficiency can result in better compression, and smaller encoded bitstreams.

Various cylindrical equal-area projections can be used to map the equatorial segment of the segmented sphere pole projection to a two-dimensional format. For example, a video coding system can apply a Lambert cylindrical equal-area projection to performing the mapping. The Lambert cylindrical equal-area projection is one of a class projections for projecting spherical shapes to two-dimensional formats, where the two-dimensional format has no distortion along the equator of the sphere and distortion that increases between the equator and the poles. Equal-area projections preserve the area of the sphere, at the expense of visual distortion in the polar regions. Other cylindrical equal-area projections include Behrmann, Gall-Peters, and others, any of which can be used to convert a 360-degree video frame to two-dimensional format. The Lambert projection provides the simplest formulas, and has been shown to result in better coding efficiency than at least some more complex cylindrical equal-area projections.

Figure 3:
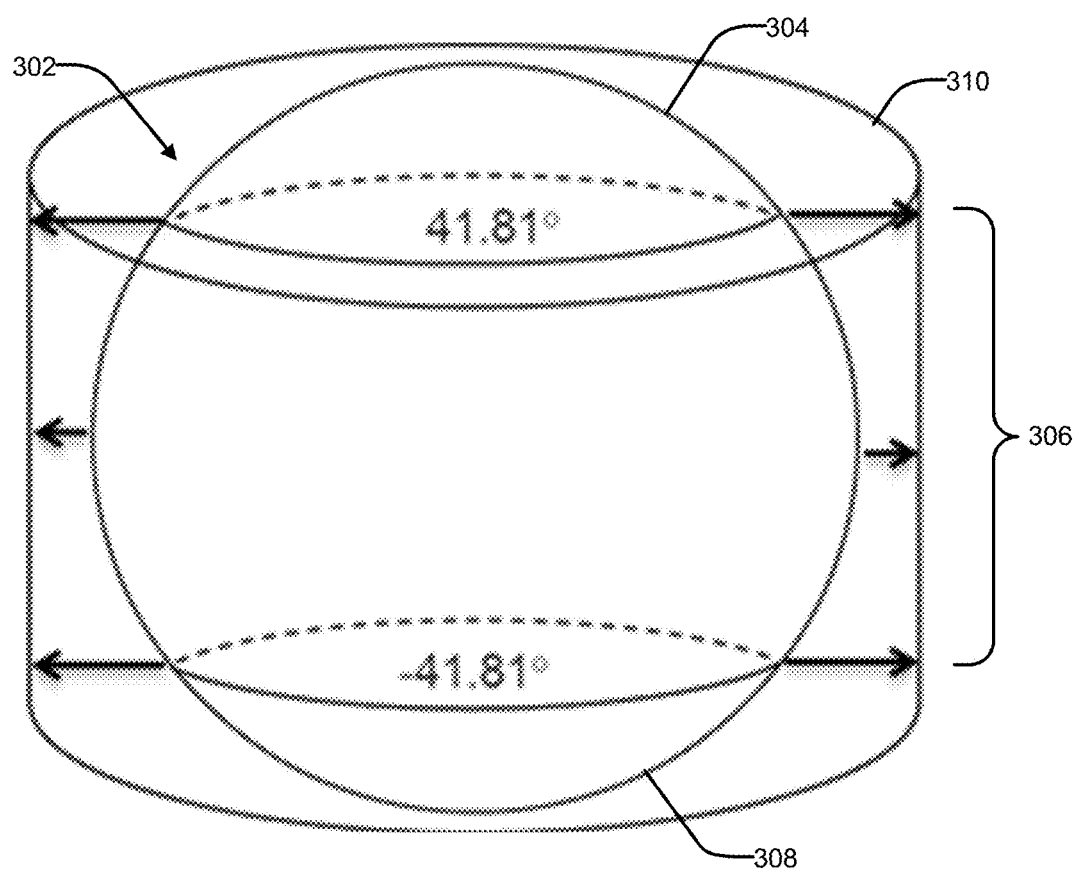
FIG. 3 is a diagram illustrating an example of application of the Lambert cylindrical equal-area projection to the equatorial segment of a sphere.

FIG. 3 is a diagram illustrating an example of application of the Lambert cylindrical equal-area projection to the equatorial region 306 of a sphere 302. The sphere 302 of this example has been segmented according to the segmented sphere projection, and thus includes a north pole region 304 and a south pole region 308 in addition to the equatorial region 306. In the example illustrated in FIG. 3, the latitude at which the north pole region 304 and the south pole region 308 are delineated is at $\pm\sin^{-1}(2/3) \approx \pm 41.81°$, which was chosen so that the equatorial region 306 includes two-thirds of the total area of the sphere and each polar segment includes one-sixth of the area of the sphere.

FIG. 3 illustrates, by way of example, a cylinder 310 onto which the pixels of the sphere 302 can be mapped. The cylinder 310 can be "unrolled" or laid flat and divided into the four faces used in projecting the sphere 302 to a two-dimensional mapping. As a result of the equatorial region 306 including two-thirds of the area of the sphere, when the equatorial region 306 is mapped to faces in a two-dimensional mapping (see, for example FIG. 2A and FIG. 2B), the number of samples in the equatorial faces is also equal to two-thirds of the samples in the two-dimensional mapping. Alternatively, in some examples, the equatorial region 306 illustrated in FIG. 3 may be mapped to rectangular faces to preserve the aspect ratio. Examples of projections are described in Aleksandar M. Dimitrijevic, Martin Lambers and Dejan D. Rancic, "Comparison of spherical cube map projections used in planet-sized terrain rendering", Facta Universitatis (NIS), Ser. Math. Inform., Vol. 31, No. 2 (2016), 259-297, which is hereby incorporated by reference, in its entirety and for all purposes.

As discussed above, the polar segments (e.g., the north pole region 304 and the south pole region 308) can be mapped to disc or circular shape in the two-dimensional mapping of the sphere 302. When mapped to discs, the samples in the two-dimensional mapping for the polar segments is less than one-third of the samples in the two-dimensional mapping. When the polar segments are mapped to be expanded into square faces, as discussed above, then each polar segment can include one-sixth of the samples in the two-dimensional mapping.

Mapping a 360-degree video frame to a two-dimensional, rectangular format involves converting from the three-dimensional space of the 360-degree video data to the two-dimensional space of the output video frame. Executing this conversion can include selecting a pixel location, (m, n), in the output video frame, and determining a point ($\phi$, $\theta$) on the spherical video data. A pixel sample can be taken from the point designated by ($\phi$, $\theta$), and placed at point (m, n) in the output video frame.

In some examples, the north pole region 304 and the south pole region 308 can be mapped using an angular fisheye projection, which can also be described as a circular pole mapping. Using a fisheye projection, the polar regions can be mapped into rectangular areas of a video frame while maintaining a circular shape.

The following equations can be used to map the north pole region 304 (e.g., Face 0) to the two-dimensional mapping:

$$\phi = \tan^{-1}\left(\frac{n + \frac{1-A}{2}}{m + \frac{1-A}{2}}\right) \quad (1)$$

$$\theta = \frac{\pi}{2} - \frac{2r}{A}\left(\frac{\pi}{2} - \sin^{-1}\left(\frac{2}{3}\right)\right) \quad (2)$$

with $r = \sqrt{\left(m + \frac{1-A}{2}\right)^2 + \left(n + \frac{1-A}{2}\right)^2}$, $$\theta \in \left(\sin^{-1}\left(\frac{2}{3}\right), \frac{\pi}{2}\right], \phi \in (-\pi, \pi].$$

The following equations can be used for the south pole region 308 (e.g., Face 1) to the two-dimensional mapping:

$$\phi = \tan^{-1}\left(\frac{\frac{A-1}{2} - n}{m + \frac{1-A}{2}}\right) \quad (3)$$

$$\theta = \frac{2r}{A}\left(\frac{\pi}{2} - \sin^{-1}\left(\frac{2}{3}\right)\right) - \frac{\pi}{2} \quad (4)$$

with $\theta \in \left(-\frac{\pi}{2}, -\sin^{-1}\left(\frac{2}{3}\right)\right], \phi \in (-\pi, \pi].$ The following equations illustrate an example application of the Lambert cylindrical equal area projection to equatorial region 306. In this example, the equatorial region 306 can be mapped to four square regions, identified by f=2 . . . 5 (e.g., Faces 2, 3, 4, and 5) using the following equations:

$$\phi = \frac{\pi}{2}\left(\frac{m+\frac{1}{2}}{A} + f - 2\right) \quad (5)$$

$$\theta = \sin^{-1}\left(\frac{2}{3}\left(1 - \frac{2}{A}\left(n+\frac{1}{2}\right)\right)\right) \quad (6)$$

In equations (5) and (6), the yaw (e.g., the horizontal angle) is in the range $$\phi \in \left(-\pi + (f-2)\frac{\pi}{2}, -\frac{\pi}{2} + (f-2)\frac{\pi}{2}\right]$$

depending on which face f=2 . . . 5 is being mapped, and pitch (e.g., the vertical angle) is in the range $$\theta \in \left[-\sin^{-1}\left(\frac{2}{3}\right), \sin^{-1}\left(\frac{2}{3}\right)\right].$$

Figure 4:
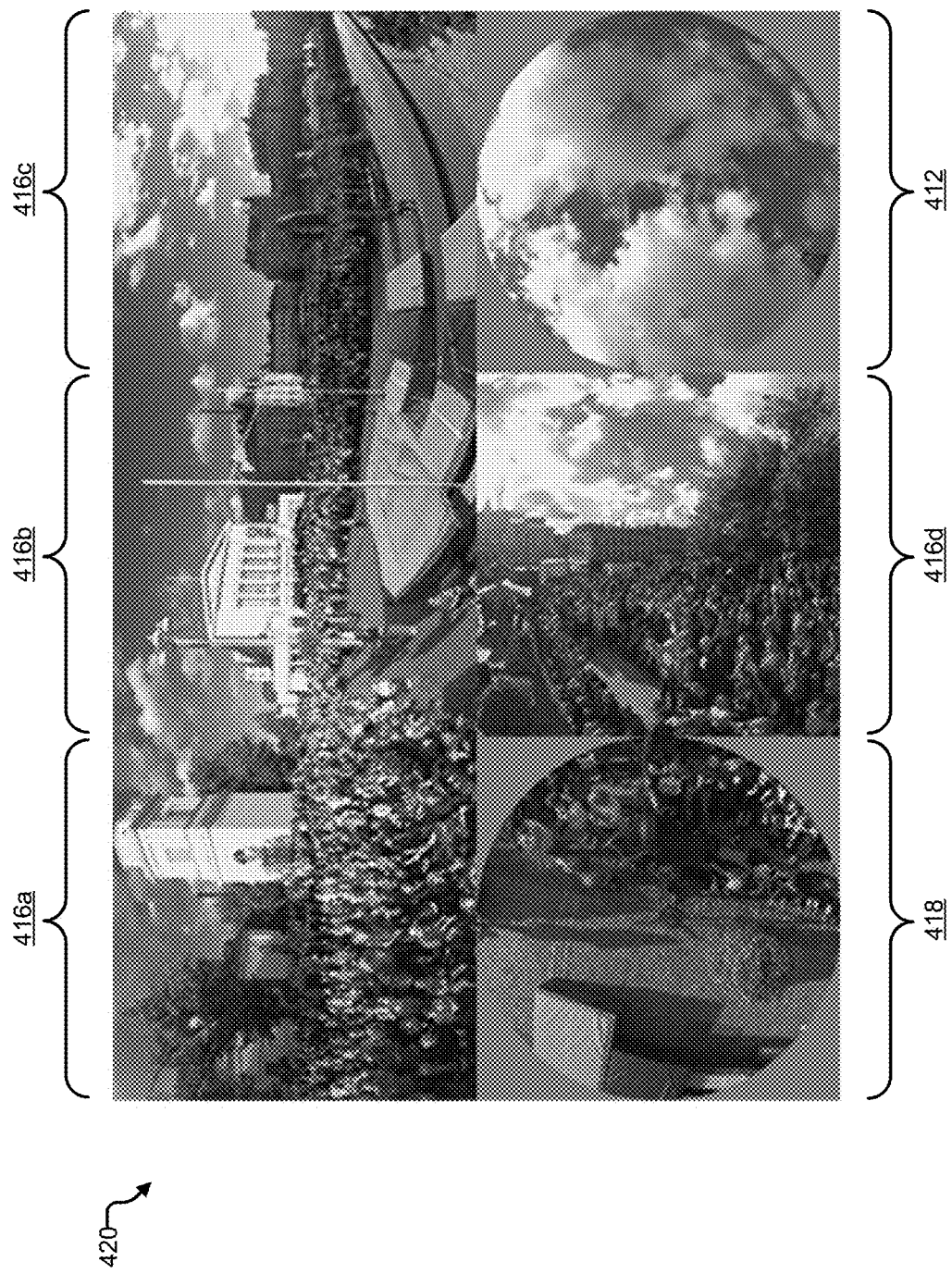
FIG. 4 is a diagram illustrating an example of the mapping of a circle to a square or a square to a circle.

FIG. 4 illustrates an example of a video frame 420 that has been mapped from 360-degree video data, using the equations above and a 3×2 arrangement, as discussed previously. In this example video frame 420, Face 2, Face 3, ad Face 4, which can be referred to as a left view 416a, a front view 416b, and a right view 416c, have been placed next to one another in the top half of the video frame 420. The left view 416a, front view 416b, and right view 416c thus can form a region where the pixels appear to transition smoothly between the views. In the bottom half of the video frame 420, Face 5, which can be referred to as the back view 416d, has been rotated −90 degrees and has been placed between Face 1 (the bottom view 418) and Face 0 (the top view 412). The bottom view 418 and the top view 412 have also been rotated to align with the edges of the back view 416d. The rotation of the bottom view 418, back view 416d, and top view 412 results in continuous pixels at least where the bottom view 418 is adjacent to the back view 416d, and where the back view 416d is adjacent to the top view 412.

As discussed above, a fisheye projection results in the pixels of the north and south pole regions each occupying a circular areas within the square areas into which the pixels are mapped. The fisheye projection is able to preserve most of the data from the spherical video data, though some loss may occur due to the pixels being warped into the circular shape. Additionally, the square regions have corner areas where the pixels are filled with grey or some other value, rather than with pixel data from the spherical video data. When encoded, the corner areas can reduce coding efficiency, due to having non-video data. Additionally, the corner areas add unnecessary data, since the data from the corner areas will be discarded when the video frame is rendered for display.

In some examples, the circular polar data can be mapped into the square areas of the video frame using a circle-to-square conversion. When the video frame is rendered for display, a video coding system can use a square-to-circle conversion to reconstruct the polar regions.

Figure 5:
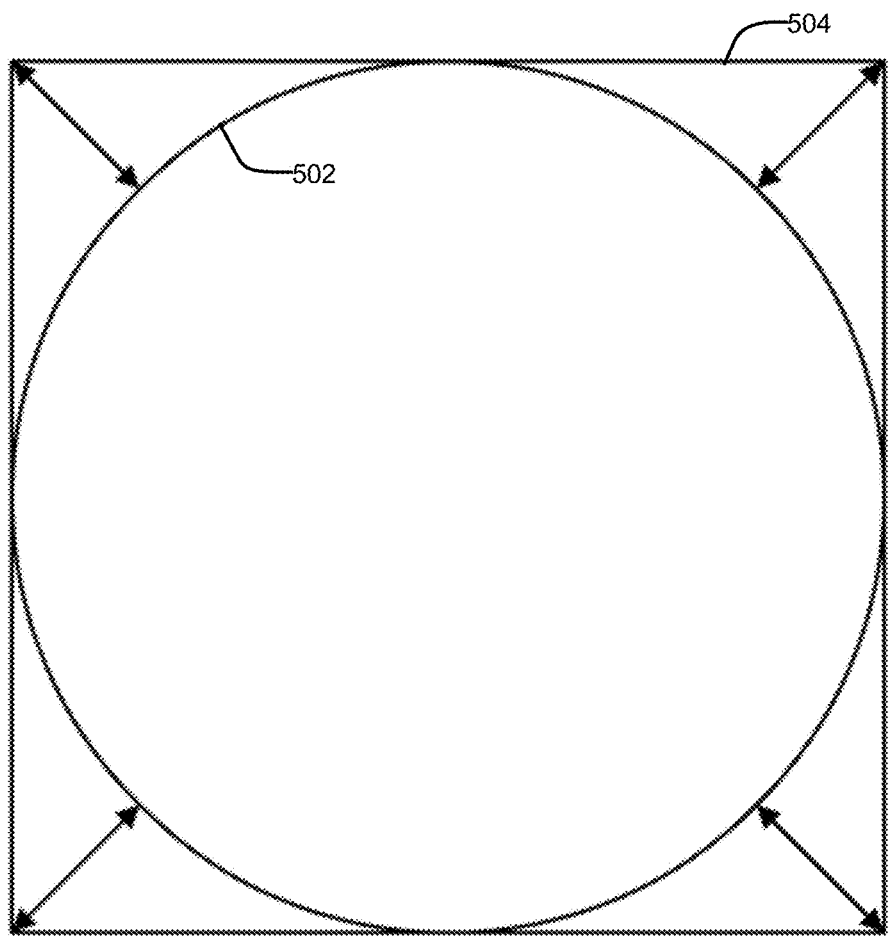
FIG. 5 is a diagram illustrating an example of the mapping of a circle to a square and a square to a circle.

FIG. 5 is a diagram illustrating an example of the mapping of a circle 502 to a square 504 and a square 504 to a circle 502. Various techniques can be used to accomplish these mappings, some of which are described in M. Lambers, "Mappings between Sphere, Disc, and Square," Journal of Computer Graphics Techniques, Vol. 5, No. 2, 2016, which is hereby incorporated by reference, in its entirety and for all purposes. For example, Fernandez-Gausti's squircle mapping, the elliptical arc mapping, or another mapping can be used. Use of circle-to-square and square-to-circle conversions for projecting 360-degree video data to a two-dimensional format, and from a two-dimensional format back to a 360-degree representation is further discussed in U.S. application Ser. No. 15/352,436, filed on Npv. 15, 2016, which is incorporated by reference herein in its entirety.

Figure 6:
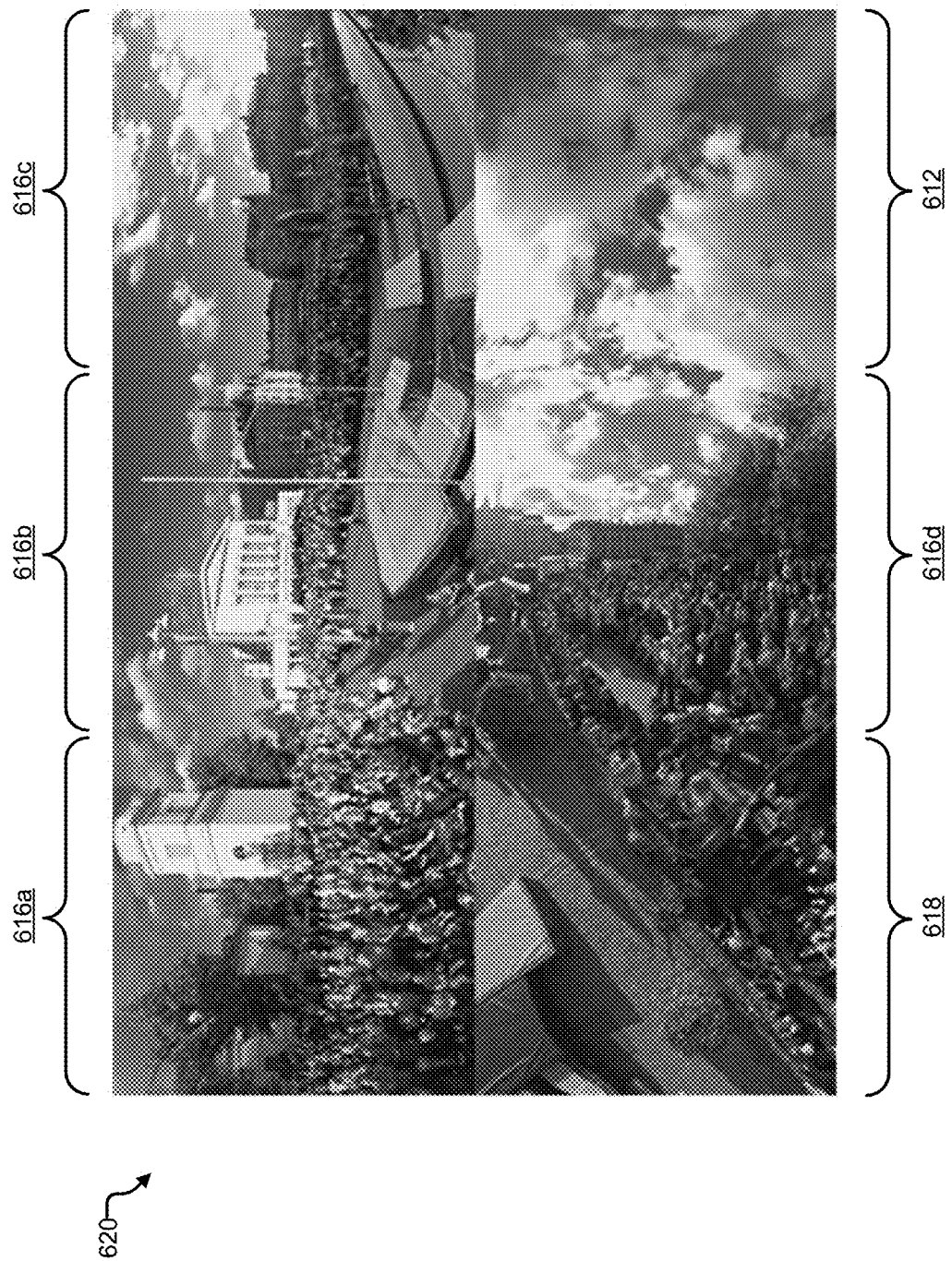
FIG. 6 illustrates an example of a video frame that has been mapped from 360-degree video data using a cylindrical equal-areal projection for the equatorial region and a circle-to-square mapping for the polar regions.
Figure 9:
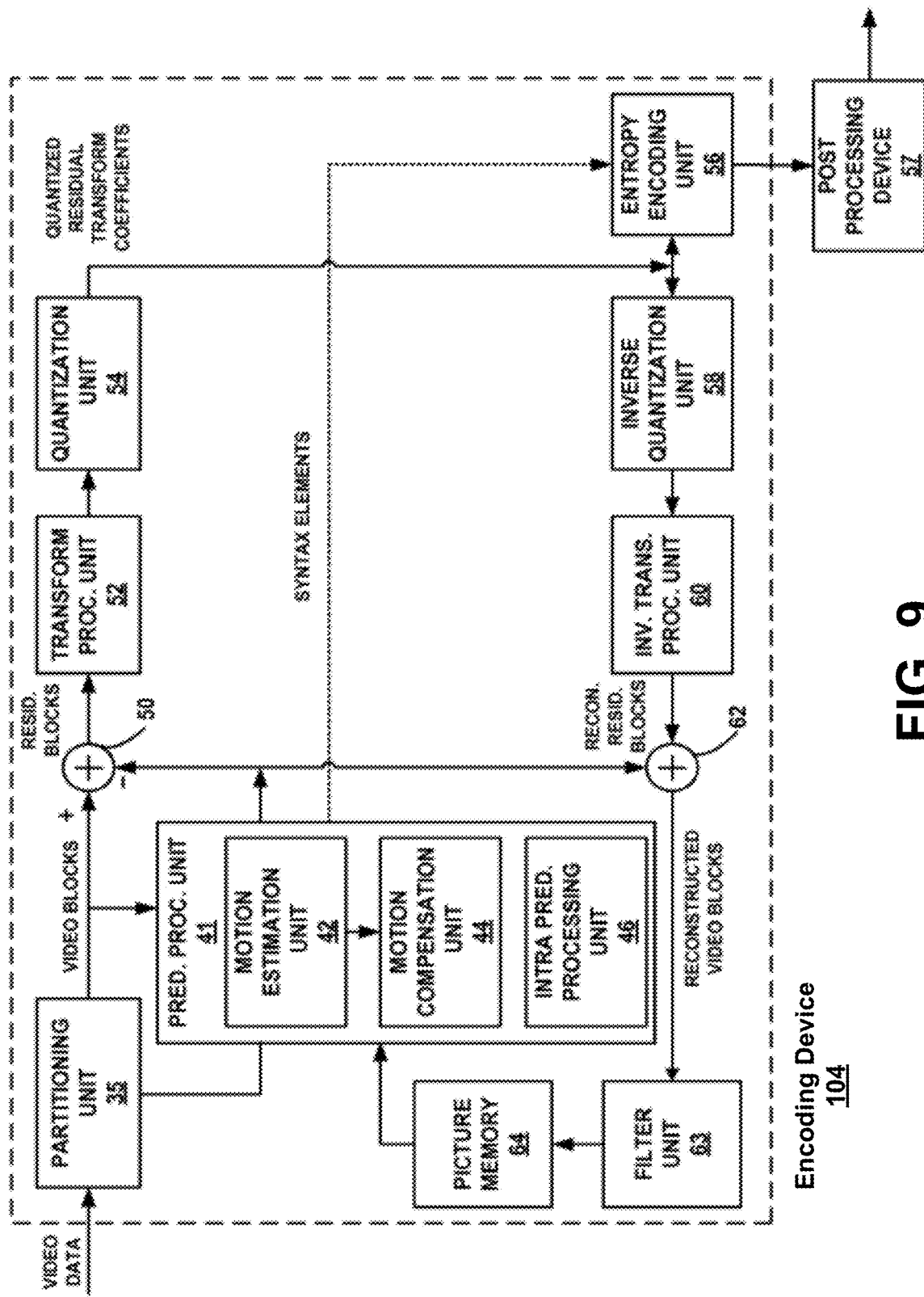
FIG. 9 is a block diagram illustrating an example encoding device.
Figure 10:
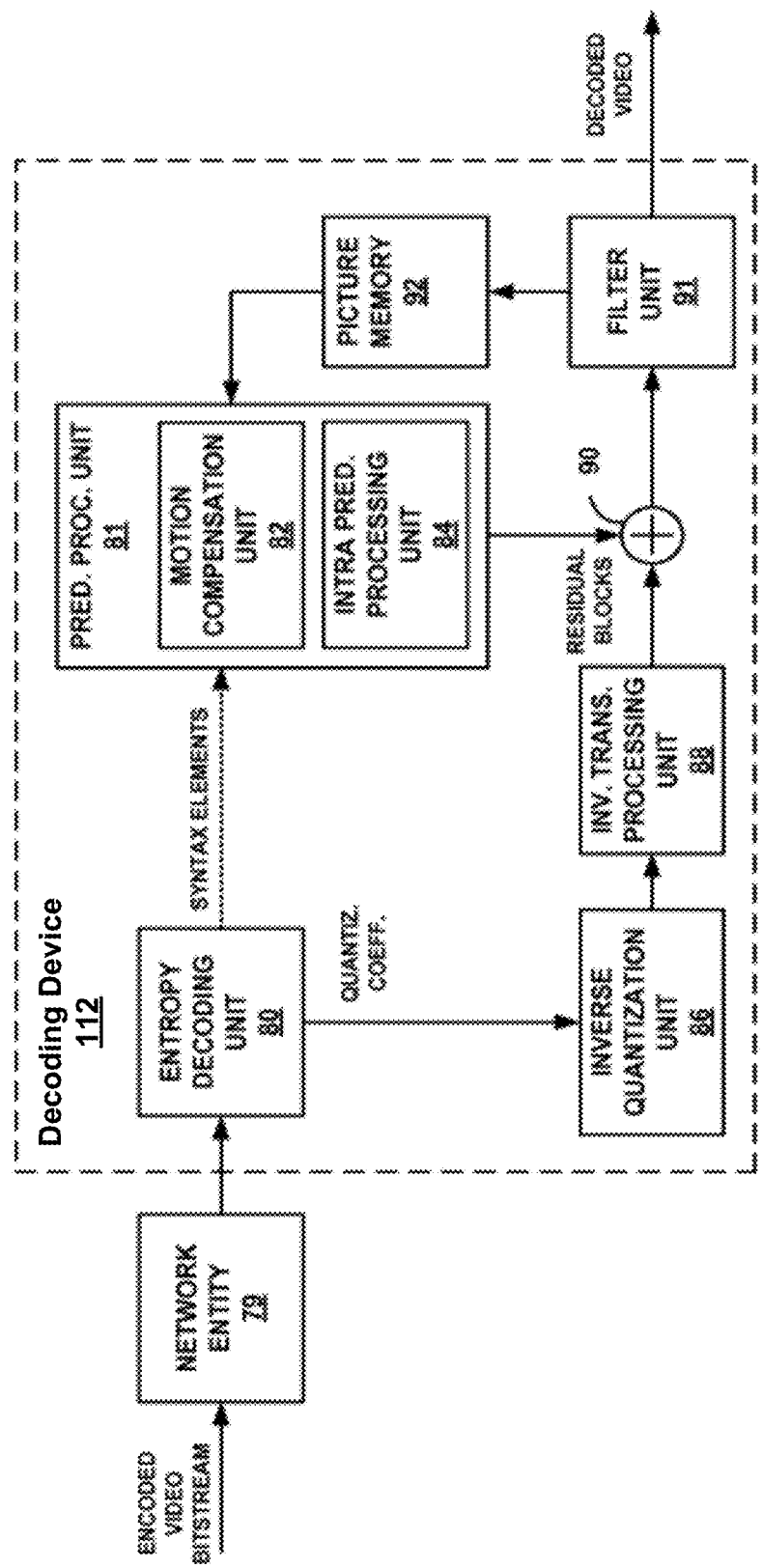
FIG. 10 is a block diagram illustrating an example decoding device.

FIG. 6 illustrates an example of a video frame 620 that has been mapped from 360-degree video data using a cylindrical equal-areal projection for the equatorial region and a circle-to-square mapping for the polar regions. The example video frame 620 arranges the different faces or views with three across and two high. As in the example of FIG. 4, in FIG. 6, Face 2, Face 3, ad Face 4, which can be referred to as a left view 616a, a front view 616b, and a right view 616c, have been placed next to one another in the top half of the video frame 620. In the bottom half of the video frame 620, Face 5, which can be referred to as the back view 616d, has been rotated −90 degrees and has been placed between Face 1 (the bottom view 618) and Face 0 (the top view 612).

In this example, the polar regions of the bottom view 618 and the top view 612 have been expanded to fill the square areas of the video frame 620 into which the polar regions have been mapped. The bottom view 618 and the top view 612 have been rotated to align with the edges of the back view 616d. As a result, the pixels across the bottom view 618, back view 616d, and top view 612 are nearly continuous. In some examples, a small amount of distortion may appear where the bottom view 618 meets the back view 616d and/or where the top view 612 meets the back view 616d.

By expanding the circular polar regions into square areas of the video frame, it is no longer necessary to fill the bottom view 618 and the top view 612 with pixel data that may decrease coding efficiency and that will be discarded when the video frame 620 is rendered for display. The arrangement of the bottom view 618, back view 616d, and top view 612 in the lower half of the video frame 620 results in a quasi-continuous region. Smooth transitions between each view is desirable because encoding of the video frame can result in a more compact encoded representation than when the transitions are abrupt. In other examples other arrangements of the views can be used, such as a 1×6 arrangement or a 6×1 arrangement. Alternatively or additionally, in other examples, the top and bottom views can be placed in the top or the bottom of the video frame 620, on the left or the right, or in some other part of the video frame 620. Alternatively or additionally, other rotations of the top and bottom views can be applied before the top and bottom views are mapped to the video frame, to achieve different quasi-continuous regions.

Once mapped to a two-dimensional format, the video frame can be encoded for storage and transport. The video frame can also be mapped back to a three-dimensional, spherical representation, and then be viewed using a 360-degree video play device.

To produce a spherical representation from the two-dimensional mapping of a video frame, a video coding system can perform a three-dimensional to two-dimensional conversion. Executing this conversion can include selecting a point on the sphere (φ, θ) and determining a corresponding point (m, n) in the two-dimensional mapping. A pixel can then be sampled from the point in the two-dimensional mapping, and be placed at the point in the sphere. In the following equations, the dimensions of each face is assumed to be A×A.

The following equations can be used to map the top view (e.g., Face 0) to the north pole region:

$$m = \frac{A}{2}\left(1 + \frac{\left(\frac{\pi}{2} - \theta\right)\sin\phi}{\left(\frac{\pi}{2} - \sin^{-1}\left(\frac{2}{3}\right)\right)}\right) - \frac{1}{2} \quad (7)$$

$$n = \frac{A}{2}\left(1 + \frac{\left(\frac{\pi}{2} - \theta\right)\cos\phi}{\left(\frac{\pi}{2} - \sin^{-1}\left(\frac{2}{3}\right)\right)}\right) - \frac{1}{2} \quad (8)$$

with $\theta \in \left(\sin^{-1}\left(\frac{2}{3}\right), \frac{\pi}{2}\right]$, $\phi \in (-\pi, \pi]$.

The following equations can be used to map the bottom view (e.g., Face 1) to the south pole region:

$$m = \frac{A}{2}\left(1 + \frac{\left(\frac{\pi}{2} + \theta\right)\sin\phi}{\left(\frac{\pi}{2} - \sin^{-1}\left(\frac{2}{3}\right)\right)}\right) - \frac{1}{2} \quad (9)$$

$$n = \frac{A}{2}\left(1 - \frac{\left(\frac{\pi}{2} + \theta\right)\cos\phi}{\left(\frac{\pi}{2} - \sin^{-1}\left(\frac{2}{3}\right)\right)}\right) - \frac{1}{2} \quad (10)$$

with $\theta \in \left(-\frac{\pi}{2}, -\sin^{-1}\left(\frac{2}{3}\right)\right]$, $\phi \in (-\pi, \pi]$.

The left, front, right, and back views, identified by f=2 . . . 5, respectively that include the equatorial area of the video frame can be mapped to the equatorial region of the sphere using the following equations:

$$m = \frac{2\phi}{\pi}A + (4-f)A - \frac{1}{2} \quad (11)$$

$$n = \frac{A}{2}\left(1 - \frac{3}{2}\sin\theta\right) - \frac{1}{2} \quad (12)$$

In equations (11) and (12), the yaw (e.g., the horizontal angle) is in the range $\phi \in$ $$\left(-\pi + (f-2)\frac{\pi}{2}, -\frac{\pi}{2} + (f-2)\frac{\pi}{2}\right]$$

depending on which face f=2 . . . 5 is being mapped, and the pitch (e.g., the vertical angle) is in the range $$\theta \in \left[-\sin^{-1}\left(\frac{2}{3}\right), \sin^{-1}\left(\frac{2}{3}\right)\right].$$

Using the projection discussed above to map 360-degree video frames to two-dimensional mappings can improve coding efficiency of the 360-degree video. For instance, per common test conditions described in J. Boyce, E. Alshina, A. Abbas, Y. Ye, "JVET common test conditions and evaluation procedures for 360-degree video", JVET-E1030, which is hereby incorporated by reference, in its entirety and for all purposes, the coding gain when using the mapping illustrated in FIG. 4 is −11.4%.

FIG. 7 illustrates an example of a process 700 for processing video data according to the techniques discussed above. At 702, the process 700 includes obtaining 360-degree video data including a plurality of video frames, each video frame of the plurality of video frames including a spherical representation of video data for the video frame. In some examples, the 360-degree video data can be obtained directly from a video capture device. In these examples, the spherical representation can include multiple pictures that were captured simultaneously, such as multiple rectangular pictures or one or more fisheye pictures. Alternatively or additionally, the 360-degree video data can include video frames in which multiple pictures that have been stitched together by the video capture device or another device. In some examples, the 360-degree video data obtained in a rectangular format (e.g., an equirectangular or cube map format) can be mapped to a spherical representation.

At 704, the process 700 includes segmenting a video frame from the plurality video frames into a top region, a middle region, and a bottom region. The top region includes a first circular area of the spherical representation. The bottom region includes a second circular area of the spherical representation that is opposite on the spherical representation from the first circular area. The middle region includes an area of the spherical representation not included in the top region or the bottom region. The video frame can be segmented at a first latitude above an equator of the spherical representation and a second latitude below the equator. The first latitude and the second latitude can be equidistant from the equator. In some examples, the angle of the latitudes is 41.81 degrees from the equator. In other examples, the angle of the latitudes is greater or less than 41.81 degrees. In some examples, the middle region includes two-thirds the area of the spherical representation.

At 706, the process 700 includes mapping, using a cylindrical equal area projection, the middle region to one or more rectangular areas of an output video frame. The cylindrical equal area projection can be, for example, the Lambert cylindrical equal area projection. Mapping the middle region can include, for example, selecting a pixel location in the output video frame and determining a point on the spherical representation corresponding to the pixel location. In this example, the point on the spherical representation can be determined using a mapping for converting a two-dimensional rectangle to a three-dimensional sphere, such as an equirectangular projection. Mapping the middle region can further include sampling a pixel at the point on the spherical representation, and assigning the sampled pixel to the pixel location in the video frame. Use of a cylindrical equal area projection to map the middle region preserves the area of the middle region when the middle region is mapped to the output video frame. In preserving the area, the aspect ratio of the middle region may be modified. In contrast, a projection such as an equal area projection preserves the aspect region of the middle region while changing the area. Preserving the area of the middle region can improve coding efficiency over preserving the aspect ratio.

In some examples, the middle region includes parts that can be designated a left view, a front view, and a right view. In these examples, the part designated as the left view can be placed in the output video frame adjacent to the part designated as the front view. Additionally, the part designated as the right view is placed adjacent to front view. In these examples, the left, front, and right views can form a continuous area in the output video frame, where continuous means that pixels that are adjacent in the spherical representation are placed adjacent to one another in the output video frame.

In some examples, the middle region includes a part that can be designated as a back view. In these examples, the bottom region can be placed in the output video frame adjacent to part designated as the back view, and the top region can also be placed adjacent to the back view. In these examples, the bottom region and the top region can form an area in the output video frame that is substantially continuous.

In some examples, the process 700 further includes mapping the top region into the output video frame. The top region can be mapped using an angular fisheye projection and/or a projection that converts a circular area into a square area. In these examples, the process 700 also includes mapping the bottom region into the output video frame. The bottom region can be mapped using an angular fisheye projection and/or a projection that converts a circular area into a square area.

In some examples, the output video frame has a three-by-two aspect ratio. A three-by-two aspect ratio may encode more efficiently than other aspect ratios. In some examples, the output video frame can be encoded, using, for example, the HEVC or AVC codec (or another codec) for storage and/or transmission.

FIG. 8 illustrates an example of a process 800 for processing video data according to the techniques discussed above. At 802, the process 800 includes obtaining 360-degree video data including a plurality of video frames, each video frame from the plurality of video frames including a two-dimensional representation of video data for the video frame. In some examples, the 360-degree video data can be obtained from an encoded bitstream. The encoded bitstream may have been read from a storage location, and/or may have been received from a transmission. In these examples, the bitstream can be decoded into rectangular video frames.

At 804, the process 800 includes identifying one or more rectangular areas of a video frame from the plurality of video frames. The one or more rectangular areas can include, for example, a left view, a front view, a right view, and/or a back view. In some examples, the one or more rectangular areas include two-thirds an area of the video frame.

At 806, the process 800 includes mapping, using a cylindrical equal area projection, the one or more rectangular areas into a middle region of a spherical representation of the video data, the spherical representation further including a top region and a bottom region, wherein the middle region is located between the top region and the bottom region. The cylindrical equal area projection can be, for example, the Lambert cylindrical equal area projection. Mapping the one or more rectangular areas can include, for example, selecting a point on spherical representation, and determining a pixel location in the video frame that corresponds to the point. The pixel location can be determined using a mapping for converting a three-dimensional sphere to a two-dimensional rectangle, such as an equirectangular projection, a cube map projection, or another projection. Mapping the one or more additional rectangular areas can further include sampling a pixel from the pixel location, and assigning the sampled pixel to the point on the spherical representation.

In some examples, the process 800 can further include mapping a first rectangular area of the video frame into the top region, and mapping a second rectangular of the video frame into the bottom region. The first rectangular area and/or the second rectangular area can be mapped using an angular fisheye projection and/or a projection for converting a square area to a circular area.

The top region can include, for example, a surface of the spherical representation that is above a first latitude of the spherical representation. As a further example, the bottom region can include a surface of the spherical representation below a second latitude of the spherical representation. In this example, the first latitude and the second latitude can be equidistant from an equator of the spherical representation. In some examples, the latitudes are at 41.81 degrees from the equator. In some examples, the latitudes are degrees that are greater than or less than 41.81 degrees.

In some examples, the video frame has a three-by-two aspect ratio. In these examples, the video frame can include two rows of three views or faces.

In some examples, the one or more rectangular areas include areas that can be designated as a left view, a front view and a right view. In these examples, the area designated as the left view can be located adjacent to the area designated as the front view, and the area designated as the right view can also be located adjacent to the front view. In these examples, the left, front, and right views can form a continuous area in the video frame.

In some examples, the one or more rectangular areas include an area that can be designates as a back view. In these examples, the first rectangular area can be adjacent to the area designated as the back view, and the second rectangular area can also be adjacent to the back view. In these examples, the first rectangular area, the back view, and the second rectangular area can form a continuous area in the video frame.

In some examples, the processes 700, 800 may be performed by a computing device or an apparatus, such as a video coding device. A video coding device can include, for example, a video encoding system and/or a video decoding system. In some cases, the computing device or apparatus may include a processor, microprocessor, microcomputer, or other component of a device that is configured to carry out the steps of processes 700, 800. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

The processes 700, 800 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700, 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

A video coding system, including an encoding system and/or a decoding system can be used to encode and/or decode video data. An example video encoding and decoding system includes a source device that provides encoded video data to be decoded at a later time by a destination device. In particular, the source device provides the video data to the destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, the source device and the destination device may be equipped for wireless communication.

The video data captured by a camera (e.g., a fisheye camera, or other suitable camera or cameras) can be coded to reduce the amount of data needed for transmission and storage. Coding techniques may be implemented in an example video encoding and decoding system. In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of the source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if the video source is a video camera, the source device and the destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Specific details of an encoding device 104 and a decoding device 112 are shown in FIG. 12 and FIG. 13, respectively. FIG. 12 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 12, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 12 represents an example of a video encoder configured to generate syntax for a encoded video bitstream. The encoding device 104 may, for example, generate VPS, SPS, and PPS parameter sets as described above. The encoding device 104 may perform any of the techniques described herein, including the processes described above. The techniques of this disclosure have generally been described with respect to the encoding device 104, but as mentioned above, some of the techniques of this disclosure may also be implemented by post processing device 57.

FIG. 13 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 12.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 13 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for processing video data, comprising:
obtaining 360-degree video data including a plurality of video frames, each video frame of the plurality of video frames including a spherical representation of video data for each video frame;
segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region; and
mapping, using a cylindrical equal area projection, the middle region to one or more rectangular areas of an output video frame, the mapping including selecting a pixel location in the output video frame, determining a point on the spherical representation that corresponds to the pixel location using a mapping for converting a two-dimensional rectangle to a three-dimensional sphere, sampling a pixel at the point on the spherical representation, and assigning the sampled pixel to the pixel location in the output video frame.

2. The method of claim 1, wherein the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

3. The method of claim 1, wherein the middle region includes two-thirds of the area of the spherical representation.

4. The method of claim 1, wherein the middle region includes a left view, a front view, and a right view, wherein the left view is placed in the output video frame adjacent to the front view, and wherein the right view is placed adjacent to the front view.

5. The method of claim 1, wherein the middle region includes a back view, wherein the bottom region is placed in the output video frame adjacent to the back view, and wherein the top region is placed adjacent to the back view.

6. The method of claim 1, further comprising:
mapping the top region into the output video frame; and
mapping the bottom region into the output video frame.

7. The method of claim 1, wherein the output video frame has a three-by-two aspect ratio.

8. A video coding device comprising:
a memory configured to store 360-degree video data including a plurality of video frames, each video frame of the plurality of video frames including a spherical representation of video data for each video frame; and a processor configured to:
segment a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region; and
map, using a cylindrical equal area projection, the middle region to one or more rectangular areas of an output video frame, the mapping including selecting a pixel location in the output video frame, determining a point on the spherical representation that corresponds to the pixel location using a mapping for converting a two-dimensional rectangle to a three-dimensional sphere, sampling a pixel at the point on the spherical representation, and assigning the sampled pixel to the pixel location in the output video frame.

9. A non-transitory computer-readable medium having stored thereon instructions that, when executed by one or more processors, cause the one or more processors to perform operations including:
obtaining 360-degree video data including a plurality of video frames, each video frame of the plurality of video frames including a spherical representation of video data for each video frame;
segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region; and
mapping, using a cylindrical equal area projection, the middle region to one or more rectangular areas of an output video frame, the mapping including selecting a pixel location in the output video frame, determining a point on the spherical representation that corresponds to the pixel location using a mapping for converting a two-dimensional rectangle to a three-dimensional sphere, sampling a pixel at the point on the spherical representation, and assigning the sampled pixel to the pixel location in the output video frame.

10. An apparatus, comprising:
means for obtaining 360-degree video data including a plurality of video frames, each video frame of the plurality of video frames including a spherical representation of video data for each video frame;
means for segmenting a video frame from the plurality of video frames into a top region, a middle region, and a bottom region, the top region including a first circular area of the spherical representation, the bottom region including a second circular area of the spherical representation that is opposite on the spherical representation from the first circular area, wherein the middle region includes an area of the spherical representation not included in the top region or the bottom region; and
means for mapping, using a cylindrical equal area projection, the middle region to one or more rectangular areas of an output video frame, the mapping including selecting a pixel location in the output video frame, determining a point on the spherical representation that corresponds to the pixel location using a mapping for converting a two-dimensional rectangle to a three-dimensional sphere, sampling a pixel at the point on the spherical representation, and assigning the sampled pixel to the pixel location in the output video frame.

11. A method for processing video data, comprising:
obtaining 360-degree video data including a plurality of video frames, each video frame from the plurality of video frames including a two-dimensional representation of video data for each video frame;
identifying one or more rectangular areas of a video frame from the plurality of video frames; and
mapping, using a cylindrical equal area projection, the one or more rectangular areas into a middle region of a spherical representation of the video data, the spherical representation further including a top region and a bottom region, wherein the middle region is located between the top region and the bottom region, the mapping including selecting a point on the spherical representation, determining a pixel location in the video frame that corresponds to the point using a mapping for converting a three-dimensional sphere to two-dimensional rectangle, sampling a pixel from the pixel location, and assigning the sampled pixel to the point on the spherical representation.

12. The method of claim 11, wherein the top region includes a surface of the spherical representation above a first latitude of the spherical representation, wherein the bottom region includes a surface of the spherical representation below a second latitude of the spherical representation, wherein the first latitude and the second latitude are equidistant from an equator of the spherical representation.

13. The method of claim 11, wherein the one or more rectangular areas include two-thirds an area of the video frame.

14. The method of claim 11, wherein the one or more rectangular areas include a left view, a front view and a right view, wherein the left view is located adjacent to the front view, and wherein the right view is adjacent to the front view.

15. The method of claim 11, wherein the one or more rectangular areas include a back view, wherein a first rectangular area including a bottom view is adjacent to the back view, and wherein a second rectangular area including a top view is adjacent to the back view.

16. The method of claim 11, further comprising:
mapping a first rectangular area of the video frame into the top region; and
mapping a second rectangular area of the video frame into the bottom region.

17. The method of claim 11, wherein the video frame has a three-by-two aspect ratio.

18. A video coding device comprising:
a memory configured to store 360-degree video data including a plurality of video frames, each video frame from the plurality of video frames including a two-dimensional representation of video data for each video frame; and
a processor configured to:
identify one or more rectangular areas of a video frame from the plurality of video frames; and
map, using a cylindrical equal area projection, the one or more rectangular areas into a middle region of a spherical representation of the video data, the spherical representation further including a top region and a bottom region, wherein the middle region is located between the top region and the bottom region, the mapping including selecting a point on the spherical representation, determining a pixel location in the video frame that corresponds to the point using a mapping for converting a three-dimensional sphere to two-dimensional rectangle, sampling a pixel from the pixel location, and assigning the sampled pixel to the point on the spherical representation.

19. A non-transitory computer-readable medium having stored thereon instructions that, when executed by one or more processors, cause the one or more processors to perform operations including:
   obtaining 360-degree video data including a plurality of video frames, each video frame from the plurality of video frames including a two-dimensional representation of video data for each video frame;
   identifying one or more rectangular areas of a video frame from the plurality of video frames; and
   mapping, using a cylindrical equal area projection, the one or more rectangular areas into a middle region of a spherical representation of the video data, the spherical representation further including a top region and a bottom region, wherein the middle region is located between the top region and the bottom region, the mapping including selecting a point on the spherical representation, determining a pixel location in the video frame that corresponds to the point using a mapping for converting a three-dimensional sphere to two-dimensional rectangle, sampling a pixel from the pixel location, and assigning the sampled pixel to the point on the spherical representation.

20. An apparatus, comprising:
   means for obtaining 360-degree video data including a plurality of video frames, each video frame from the plurality of video frames including a two-dimensional representation of video data for each video frame;
   means for identifying one or more rectangular areas of a video frame from the plurality of video frames; and
   means for mapping, using a cylindrical equal area projection, the one or more rectangular areas into a middle region of a spherical representation of the video data, the spherical representation further including a top region and a bottom region, wherein the middle region is located between the top region and the bottom region, the mapping including selecting a point on the spherical representation, determining a pixel location in the video frame that corresponds to the point using a mapping for converting a three-dimensional sphere to two-dimensional rectangle, sampling a pixel from the pixel location, and assigning the sampled pixel to the point on the spherical representation.

21. The video coding device of claim 8, wherein the video frame is segmented at a first latitude above an equator of the spherical representation and a second latitude below the equator, wherein the first latitude and the second latitude are equidistant from the equator, wherein the top region is above the first latitude, and wherein the bottom region is below the second latitude.

22. The video coding device of claim 8, wherein the middle region includes two-thirds of the area of the spherical representation.

* * * * *